Nov. 10, 1953

G. S. HARRIS, JR 2,658,645

DISPENSING MACHINE FOR BEVERAGES
HAVING PLURAL INGREDIENTS

Filed Jan. 31, 1950

Inventor
George S. Harris, Jr.
by Wright, Brown, Quinby & May
Attys

Nov. 10, 1953    G. S. HARRIS, JR    2,658,645
DISPENSING MACHINE FOR BEVERAGES
HAVING PLURAL INGREDIENTS
Filed Jan. 31, 1950    3 Sheets-Sheet 2
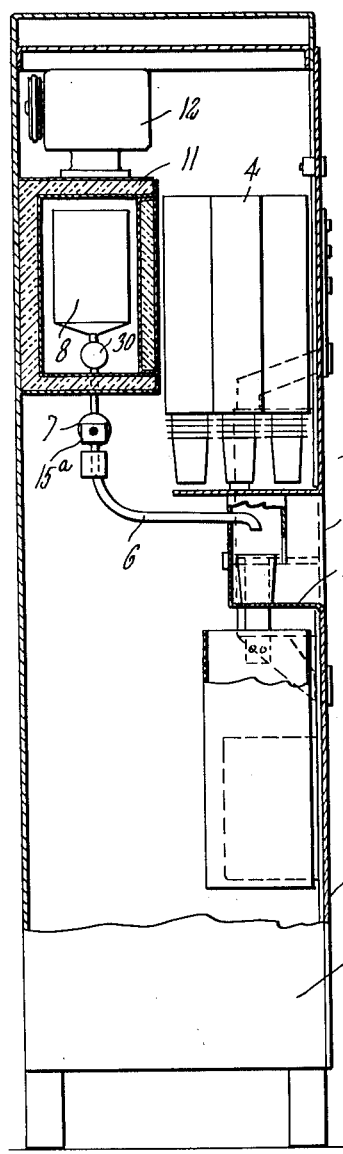
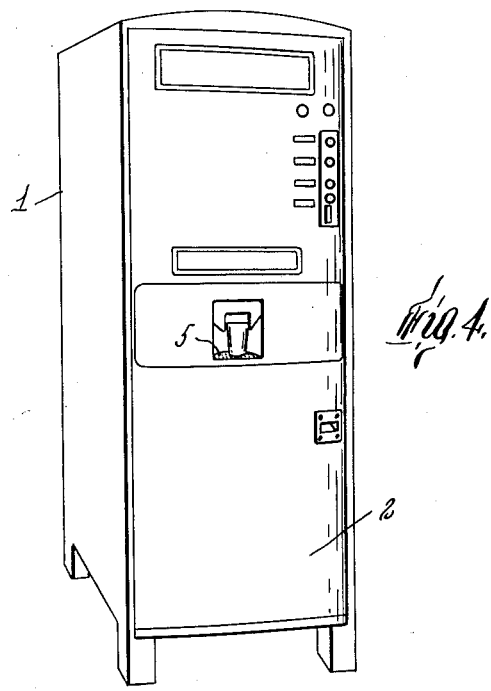
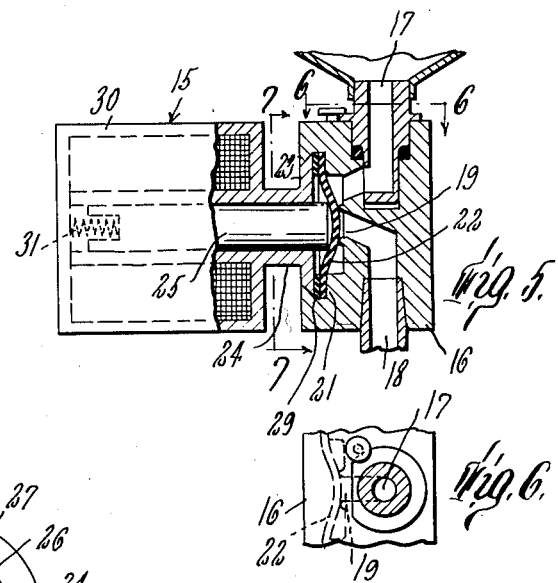
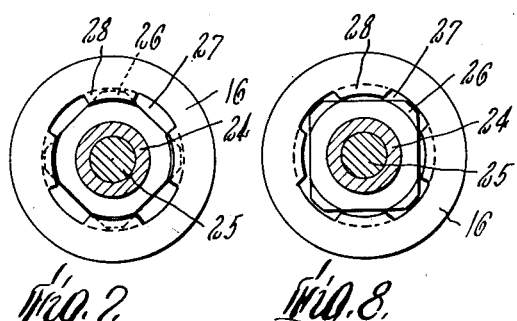
Inventor
George S. Harris, Jr.

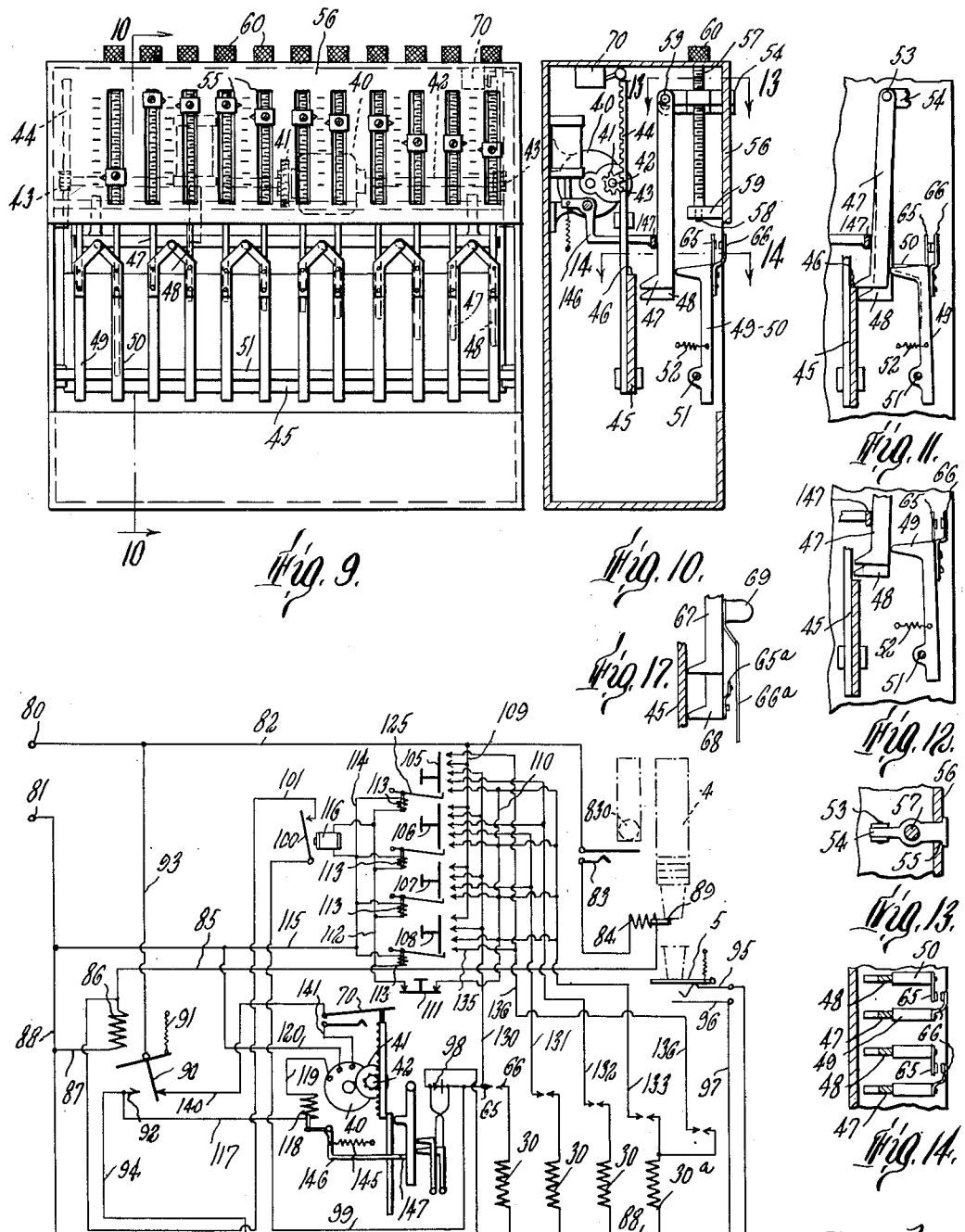

Patented Nov. 10, 1953

2,658,645

UNITED STATES PATENT OFFICE 2,658,645

DISPENSING MACHINE FOR BEVERAGES HAVING PLURAL INGREDIENTS

George S. Harris, Jr., Newton, Mass., assignor of fifty per cent to Edwin M. Thomas, Milton, and twenty-five per cent to James N. Muldoon, and twenty-five per cent to Doris C. Harris, trustee, Newton, Mass.

Application January 31, 1950, Serial No. 141,548

15 Claims. (Cl. 222—70)

This invention relates to drink dispensing machines, and more particularly to such machines arranged to dispense selectively various hot drinks such as coffee, with or without cream or sugar, hot chocolate, hot soup, or the like.

One object of the invention is to provide means for holding various extracts, cream, etc. under refrigeration in the machine until such time as portions thereof are required, while heat is added in the form of hot water which heats the drink to the desired temperature, in which condition it is delivered for consumption.

A further object is to provide for dispensing the desired total quantity of the hot drink, regardless of the presence or absence of certain ingredients, such, for example, as cream, as when black coffee is desired.

Still another object is to provide adjustably timed valves which determine the amount of any ingredients by the length of time the controlling valve is held open, the adjustment providing for variations and differences in viscosity of such ingredients.

Still another object is to provide for delivery of the various ingredients at one point with means for clearing them all from parts common to all so that each drink dispensed will be free from contamination by ingredients previously supplied.

A further object is to provide improved timing means for selective operation, opening and closing of each valve being independently timed.

Still another object is to provide for interlock between the various selector mechanisms in order to avoid the possibility of undesired combinations of ingredients at a single operation of the machine.

Still another object is to provide a dispensing machine which may be coin-operated, but in which the cycle of operations will be started automatically only when selection of a desired combination of ingredients has been made, a cup is properly positioned to receive it, and the coin has been deposited.

Further objects and advantages will appear from a description of an embodiment of the invention shown in the accompanying drawings in which Figure 1 is a front elevation of the machine, the door of the cabinet housing the various mechanisms being opened to disclose the cup storage and release mechanism.

Figure 3 is a detail sectional view on line 3—3 of Figure 1.

Figure 4 is a perspective view of the cabinet, the door being closed.

Figure 5 is a view partly in side elevation and partly broken away and in section of a solenoid-operated valve.

Figure 1:
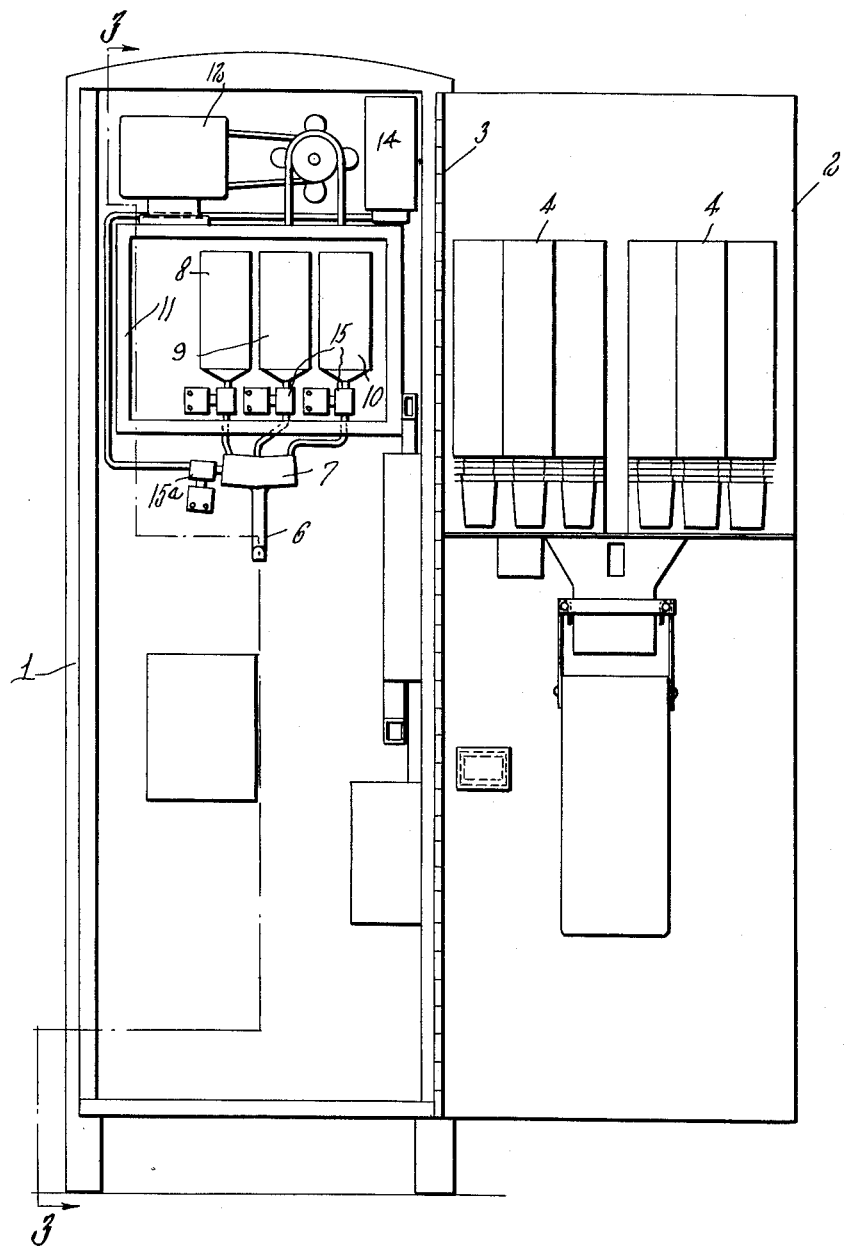

Figures 6 and 7 are detail sectional views on lines 6—6 and 7—7, respectively, of Figure 5.

Figure 8 is a view similar to Figure 7, but showing the parts in different relative positions.

Figure 9 is a front elevation of certain of the selecting mechanisms.

Figure 10 is a detail sectional view on line 10—10 of Figure 9.

Figures 11 and 12 are somewhat diagrammatic views similar to a portion of Figure 10 and showing parts of a single selector mechanism in different positions.

Figures 13 and 14 are detail sectional views on lines 13—13 and 14—14, respectively, of Figure 10.

Figure 15 is a wiring diagram somewhat simplified for use with the machine as herein illustrated.

Figure 16 is a sectional detail of one of the selector switches and related parts.

Figure 17 is a fragmentary view similar to a portion of Figure 10, but showing a modification.

Referring first to Figures 1 to 4, the dispensing machine comprises a cabinet 1 having a door 2 hinged thereto at 3 and carrying on its inner face receptacles 4 for the storage of cups into which the drinks to be dispensed may be delivered. Cups from this supply may be released one by one to descend onto a platform 5 accessible from without the cabinet through an opening 5a in the door as is shown best in Figure 4. The release of the cups one at a time may be produced by any suitable mechanism, as, for example, a coin-control mechanism, but as this forms no part of the present invention, no detail showing of such mechanism has been included herein, it being sufficient to state that through the deposit of a coin of suitable denomination, a cup is released from the lower end of the stack of one of the receptacles 4 and is allowed to drop to the platform 5 beneath the discharge pipe 6 leading from a manifold 7, this manifold constituting a device into which the various selected ingredients are delivered from suitable supply resources. As shown, for example in Figure 1, a plurality of such receptacles or containers shown at 8, 9, and 10 may be provided, though more might be porvided, if desired. These containers 8, 9 and 10 are intended, for example, to contain a supply of coffee syrup, cream, and sugar syrup, respectively. These containers as shown are arranged within an insulated compartment 11 and a refrigerating unit 12 of any suitable description may be employed to retain these containers and their contents under refrigerated conditions.

Besides these containers, there is also provided a water container 14 which may be provided with any desired type of heating means such as an electric heating unit. Such means, however, do not constitute any portion of the present invention and have therefore not been shown herein. Any suitable means may be provided for replenishing the water in the container 14 from a source of supply, and that in the container may be maintained under a slight steam pressure if desired.

Each of the containers, including those contained within the refrigerated compartment and the hot water, have their discharges controlled by valves such as are indicated at 15. A valve suitable for this service has been shown in detail in Figures 5 to 8. As therein shown it is provided with a valve body 16 provided with inlet and outlet ports 17 and 18, respectively, the inlet ports being in communication with the lower ends of the various containers. The body is also provided with a valve seat 19 which as shown is at the upper end of the discharge port 18. All the discharge ports 18 lead into a common discharge device shown in Figure 2, as the manifold 7.

The body of each valve is provided with an annular recess 21 arranged substantially concentric with the seat 19, this recess forming a seat for the reception of the marginal portion of a circular diaphragm 22. This margin of the diaphragm is clamped in sealing engagement with its seat by an extension 23 from a guide member 24 which is provided with a central hole for the slidable reception of a plunger 25. The inner end of the plunger 25 is rounded and bears against the outer face of the diaphragm outwardly of the valve seat 19, so that when this plunger is pushed inwardly, the diaphragm is deflected into the position shown in Figure 5 and seats against the valve seat 19, closing the valve.

In order to permit the parts to be disassembled readily for cleaning, the portion 23 of the guide member and the outer wall of the valve body are provided with releasable interlockable elements. For example, as shown in Figures 7 and 8, the portion 23 may be provided with a plurality of ears 26 which may be passed through slots 27 in the valve body 16 and then turned into the position shown in Figure 7, back of the retaining lugs 28 on the valve body between the slots 27. These lugs 26 and 27 may be provided with tapered engaging surfaces which act by turning the member 24 in one direction to tighten the portion 23 with an interposed gasket ring 29, if desired, against the margin of the diaphragm and the diaphragm against its seat. By turning the support 24 in the opposite direction this clamping engagement may be released, whereupon the support 24 may be removed freeing the margin of the diaphragm which may then be freely removed also.

As shown, the support 24 forms a portion of a casing for an electromagnet 30, by energization of which the plunger 25, which forms an armature therefor, may be withdrawn against the action of a spring 31, which, when free to do so, presses the plunger 25 into valve-closing position.

Other readily separable connections between each valve and its connections to the supply of each of the containers and to the discharge to the manifold 7 may be provided as may be desired.

Figure 2:
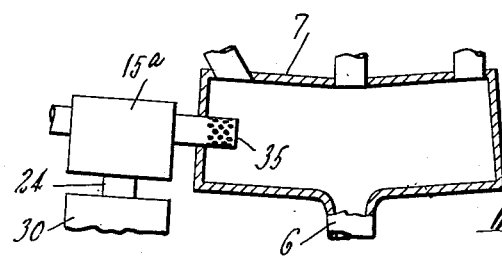
Figure 2 is a view partly in side elevation and partly in section showing the manifold and related parts through which the selected ingredients are conducted to the cup.

The valve 15a which controls the supply of hot water is preferably connected into the manifold, as shown in Figure 2, through a spray nozzle 35 in order that it may thoroughly wash out the interior of the manifold toward the latter portion of the dispensing operation in order that none of the ingredients delivered in a dispensing operation may remain in the manifold and contaminate the next succeeding drink in connection with which said ingredient may not be required. The discharge ports 18 are short and open to this hot water spray which may reach those portions of the diaphragms within the areas of the valve seats. As will later more fully appear, the water is the last ingredient introduced into the manifold so that it is employed not only to carry out the ingredients measured into the manifold from the containers within the refrigerated compartment, but it also acts to heat these ingredients and to flush them out of the discharge connections into the cup.

The means for opening and closing the valves and for controlling the times at which such actions occur during the cycle of operations of the machine are shown best in Figures 9 to 16, inclusive. Referring to Figures 9, 10 and 15, a reversible motor 40 is connected through suitable reduction gearing at 41 to rotate the shaft 42. As shown best in Figure 9, this shaft carries a pair of pinions 43 at its ends which engage in rack bars 44 which are suitably guided for rectilinear vertical motion. To the lower portions of these rack bars 44 is secured a plate 45 having an upper edge portion 46 which acts as a timing element for the various valve actuations. A series of arms arranged in pairs, as at 47 and 48, are normally arranged with their lower ends pressed toward the adjacent face of the plate 45 and on the back face of each arm bears a finger 49 or 50, the fingers 49 bearing against the arms 47 and the fingers 50 bearing against the arms 48. All of the fingers 49 and 50 are fulcrumed on a fulcrum shaft 51 and each is normally pressed forward into engagement with its arm as by a spring 52. Each of the arms 47 and 48 is pivoted at its upper end as at 53 to a carriage 54 which is slidably guided in a slot 55 in a stationary wall member 56 and is adjustable therein by having threaded engagement with a screw 57 journaled at its lower end as at 58 in a bracket 59 and at its upper end in a top wall 560. Each of the screws 57 is provided with a knurled head 60 by which it may be turned and by which the height of the arm may be adjusted as desired between the limits afforded by the length of the adjusting screw. The lower ends of each of the arms are provided with feet which ride against the adjacent face of the plate 45 and by adjustment of the height of these arms these feet are adjusted with respect to the upper edge 46 of the control plate 45 at any position of this plate. Thus whenever during downward motion of this control plate, the upper edge of the plate reaches the lower edge of the foot of one of the arms 47 or 48, this arm is moved over the upper edge of the plate 45 by the coacting finger 49 or 50 which engages on its rear face and is pressed thereagainst by its spring 52. Thus the time during the descent of the plate 45 at which the upper edge 47 of the plate reaches the lower edge of the foot may be adjusted by turning the corresponding screw 60. Each of the fingers 49 and 50 carries an electrical contact, the contacts 65 of each of the fingers 49 being disposed in one direction and the contacts 66 of the fingers 50 being disposed in the opposite direction, and the contacts 65 and 66 of each pair of fingers being arranged opposite to each other, and, as shown, substantially midway between the fingers of each pair.

The heights of the arms 47 and 48 are so adjusted that in each pair of arms, the arm 47 is freed by the upper edge of the plate 45 before the arm 48 is so freed and the freeing of the arm 47 allows its corresponding finger 49 to be moved forwardly as shown in Figure 11, this allowing the contact 66 to engage with the contact 65 of its mating finger 50. This makes the electrical contact between these parts. On subsequent freeing of the lower end of the corresponding arm 48, the finger 50 is freed, being drawn by its spring 52 so as to again break contact between the contacts 65 and 66 as shown in Figure 12. The arms thus act as operative engaging means between the corresponding fingers and the control plate edge 47 and provide for timing adjustment without requiring adjustment of the fingers with their electrical contacts.

However, if desired, the contact fingers may directly engage the plate 45 as shown in Figure 17, contact fingers 67 and 68 being substituted for the arms 47 and 48 of Figures 10 and 11 and being vertically adjustable in the same manner as by turning of the screws 55. They are biased to engage the plate 45 by any suitable means, such as springs or gravity as by counterweights 69. Because these fingers are relatively adjustable the contacts 65a and 66a carried thereby must be of sufficient length to make electrical connection with each other throughout a considerable range of adjustment, and flexible leads would be required from these contacts.

As will later appear, all but the first pair of contacts 65 and 66 (or 65a and 66a in the construction of Figure 17) control the valves for the various containers, acting first to open the valve when the corresponding arm 47 is freed and then causing the valve to close when the corresponding arm 48 is thereafter freed, and the differences in time between such freeings represent the time during which the valve is open and is allowed to feed the ingredient controlled thereby from the corresponding container into the manifold.

The first set of contacts controlled by the first set of arms 47 and 48, as shown herein, are employed to determine the total time during which the controlling plate 45 is moved in controlling direction, that is, to determine the maximum time during which any ingredient is allowed to flow into the manifold, and when this time limit is reached, means are provided for reversing the motor so as to return the controlling plate to its starting position. When it reaches the starting position, the upper end of one of the rack bars 44 actuates the switch 70, which, as will later appear, stops further motion of the motor in condition for a dispensing cycle.

The operation of the machine may be understood from a description of Figure 15. Referring to that figure, at 80 and 81 are electrical terminals from which power is taken to actuate the machine. In the position of the parts shown at the start of a cycle of operations, a lead 82 from the terminal 80 leads to a switch 83 which may be closed by any suitable means such as the placing of a coin in a coin-controlled mechanism, a coin being so indicated in dotted lines at 830. On closing of this switch, connection is made from the lead 82 to the switch 83 to a solenoid 84, lead 85, through a solenoid 86 and a lead 87, and lead 88, back to the terminal 81. The energization of the solenoid 84 acts to retract a cup support 89, allowing a cup in one of the stacks 4 to descend onto the platform 5. Any suitable means, well known in the art, may be provided if necessary or desired to retain the switch 83 closed until the cup has closed the switch 95.

The energization of the solenoid 86 acts to throw a reversing switch 90 to its left hand position against the action of a spring 91 where it makes contact with a switch terminal 92. This closes a connection from the lead 82 through a lead 93, reversing switch 90, contact 92, and lead 94 to a switch 95 which is closed to a lead 96 by the pressure of the cup in position on the platform 5. This switch 95 is connected through a lead 97 with the first set of contacts on the fingers 49 and 50 at 98, these contacts now being closed, and from this switch through a lead 99 to a switch 100 from which lead 101 passes to the lead 85 completing a holding circuit through the coil 86, thus retaining the switch 90 in this position. However, this holding circuit is maintained only when the switch 100, as well as the switches 98 and 95, is closed. The switch 100 is closed when any one of a plurality of selector mechanisms indicated as the switches 105, 106, 107, 108 is closed, since whenever any of these switches is closed, a connection is made from the lead 82 through a lead 109 through the particular switch 105 to 108 which happens to be selected, back to the lead 110, through the normally closed switch 111, lead 112 and a series of latch solenoids 113 through a lead 114 and lead 115 to the lead 88. A solenoid 116 is placed across the leads 112 and 114 so that whenever any one of these selector mechanism switches is closed, the solenoid 116 is energized and switch 100 is also closed. Under these conditions the motor 40 is energized in its forward direction from leads 82 and 93, switch 90, contact 92, leads 117, solenoid 118, lead 119, motor 40, lead 120 back to lead 115. The motor is now in operation and causes the controlling plate 45 to descend. Also the energization of the solenoids 113 has acted to throw latch members 125 up into position to obstruct the closing of all of the selector switches not already closed, and to prevent the return of the selector switch which was closed. This provides that only one selector switch may be actuated for one cycle of operations of the machine, all the others being locked out of operative condition.

The operator may press a selector switch before depositing a coin, but the cycle will not commence until a coin has been deposited and a cup has dropped in position to receive the selected drink.

Should the operator, however, having pressed one selector switch, decide that he has made a mistake in the selection, and provided the cycle of operations has not already commenced, he can return the selected switch to inoperative position, allowing him to select and depress any of the others, by first opening the switch at 111 which acts to break the circuit through the solenoid 116, so that the holding circuit for the motor switch 90 is opened and the machine cannot function until such time as one of the selector switches has been closed.

Each of the selector switches has a plurality of switch contacts which make connection from the lead 109 through suitable leads to the sets of contacts 65 and 66 of selected of the remaining fingers 49 and 50 beyond the first one which is employed to control the over-all timing of the dispensing cycle. Thus the second of these sets of contacts 65 and 66 moving to the right on Figure 9 may close a circuit through the solenoid 30 for the valve controlling the supply of coffee syrup, while those adjacent thereto, progressing from left to right in Figures 9 and 10, control the solenoids 30 for the valves controlling cream, sugar syrup, and hot water, respectively, these connections being made through the various selector switches from the lead 109 through the leads 130, 131, 132 and 133 which connect to the several solenoids 30 and back to the lead 88. Thus the selector switch 108 makes connection through the lead 130 to the solenoid controlling the coffee syrup, and through the lead 133 to the solenoid controlling the hot water supply valve. However, as when cream is not supplied, a supply of water suitable for making a drink, including cream, would be insufficient to give the same total quantity of liquid dispensed, a further supply of water is added, a connection being made by this switch 108 from the lead 109 through the contact 135, lead 136 to a fifth pair of contacts 65 and 66 which are arranged to maintain the valve solenoid 30a for the water, open a longer time when this selector switch is closed than when others of the selector switches have been closed, during which cream is supplied. This fifth pair of contacts is not operative in connection with any of the other selector switches, except that for selector switches 105 and 109 which select black coffee. Switch 109 is therefore the selector switch for black coffee. Similarly switch 107 includes cream since it closes connection through a lead 131 to the cream control valve, while switch 106 not only supplies cream but it also supplies sugar syrup by energizing the lead 132 leading to the sugar syrup control valve. Switch 105 selects the coffee syrup and sugar syrup but without the cream and it also supplies additional water by energizing the lead 136.

It will be noted that the supply of water is shut off the last of any of the ingredients and a further supply of water is added where cream is not employed.

When the first set of contacts is opened by the edge 46 of the controlling plate passing beyond the corresponding arm 48 (see Figure 12), the holding circuit for the switch 90 is broken at 92 and the spring 91 throws the switch to the position shown in Figure 15, closing connection from the lead 89 through the lead 93, the switch 90, lead 140, closed switch 70, lead 141, the reverse direction winding of the motor and the lead 120 back to the leads 114 and 82 to the terminal 81. As the solenoid 118 is deenergized in this condition, a spring 145 acts to rock a lever 146 into position to cause its extremity 147 to press all the arms 47 and 48 out of contact with the plate 45 so that the upper edge of this plate is free to be lifted and the plate returned to starting position. When this occurs the switch 70 is opened automatically and the motor stops with the parts in position for the start of a succeeding cycle.

By the use of additional containers, selector mechanism and finger contacts, it is evident that other drinks may be dispensed as desired.

From the foregoing description of embodiments of this invention it will be evident to those skilled in the art that various other changes and modifications may be made without departing from its spirit or scope.

I claim:

1. In combination, a plurality of refrigerated containers for coffee syrup, cream, and sugar syrup, a container of hot water, a valve for controlling the discharge from each of said containers, a device receiving the discharge from all of said valves, means for opening and then closing each of said valves, operator-actuated mechanisms for selecting the valves to be opened and closed during a cycle of machine operations, means for determining the time during each cycle that any of the selected valves will remain open, and means controlled by the selector mechanism selecting black coffee when said mechanism has been operated to cause said valve for the hot water container to be open for a longer period than when a selector mechanism for coffee with cream has been actuated, to substantially make up in volume of black coffee for the amount of cream dispensed when coffee with cream has been selected.

2. In combination, a plurality of containers, a valve for controlling the discharge from each of said containers, a device receiving the discharge from all of said valves, a valve-controlling member, power means for moving said member first in one direction and then in the opposite direction in a path, an opening element and a closing element for each valve, means for adjusting each of said elements lengthwise of the path of motion of said member to be controlled by said member when in predetermined relation thereto when said member is being moved in one direction, and means actuable to return said member to starting position after all of said valves have been closed.

3. In combination, a plurality of containers, a valve for controlling the discharge from each of said containers, a device receiving the discharge from all of said valves, a valve-controlling member, power means for moving said member first in one direction and then in the opposite direction in a path, an opening element and a closing element for each valve, means for adjusting each of said elements lengthwise of the path of motion of said member to be controlled by said member when in predetermined relation thereto when said member is being moved in one direction, means actuable to return said member to starting position after all of said valves have been closed, and means for holding said elements inoperative on motion of said member in the opposite direction.

4. In combination, a plurality of containers, a valve for controlling the discharge from each of said containers, a device receiving the discharge from all of said valves, a valve-controlling member, power means for moving said member first in one direction and then in the opposite direction in a path, an opening element and a closing element for each valve, means for adjusting each of said elements lengthwise of the path of motion of said member to be controlled by said member when in predetermined relation thereto when said member is being moved in one direction, means actuable to return said member to starting position after all of said valves have been closed, and mechanism for selecting the opening and closing elements to be operative during a motion of said member in said one direction.

5. In combination, a plurality of containers, a valve controlling the discharge from each of said containers, a device for receiving the discharge from all of said valves, a valve controlling member, power means for moving said member first in one direction and then in the opposite direction, a pair of fingers for each valve, operating connections from said fingers mounted to bear against said member, means for adjusting said operative connections independently of each other lengthwise of the direction of motion of said member, said member having a controlling edge for each of said operative connections with respect to which said adjustment is effective, a spring normally pressing each of said fingers toward said member and effective to move its respective operative connections into controlling position when said edge is moved therepast, one of each pair of fingers when its respective operative connections are in controlling position being effective to open its respective valve and the other of the fingers of said pair when its respective operative connections are in controlling position being effective with said one finger to close said valve, mechanisms for selecting the pairs of fingers to be operative during each motion of said member in one direction, and operator-controlled means for initiating the motion of said control member in controlling direction.

6. In combination, a plurality of containers, a valve controlling the discharge from each of said containers, a device for receiving the discharge from all of said valves, a valve controlling member, power means for moving said member first in one direction and then in the opposite direction, a pair of fingers for each valve, operating connections from said fingers mounted to bear agaist said member, means for adjusting said operative connections independently of each other lengthwise of the direction of motion of said member, said member having a controlling edge for each of said operative connections with respect to which said adjustment is effective, a spring normally pressing each of said fingers toward said member and effective to move its respective operative connections into controlling position when said edge is moved therepast, one of each pair of fingers when its respective operative connections are in controlling position being effective to open its respective valve and the other of the fingers of said pair when its respective operative connections are in controlling position being effective with said one finger to close said valve, mechanisms for selecting the pairs of fingers to be operative during each motion of said member in one direction, operator-controlled means for initiating the motion of said control member in controlling direction, means for actuating said power means to return said member to starting position on completion of a predetermined extent of motion of said member in controlling direction at the end of which all of said valves are closed, and means for holding all of said fingers in inoperative position during such return motion of said member.

7. In combination, a plurality of containers, a valve controlling discharge from each of said containers, a device for receiving the discharge from all of said valves, a valve-controlling member, means for moving said member in one direction to a predetermined limit and for then returning said member to starting position, said member having a controlling edge portion, a pair of fingers for each valve, operative connections from said fingers mounted to bear against said member when said member is moved in said direction, means for adjusting said connections independently in said direction to adjust the time when said edge portion is effective thereon during said motion of said member, each pair of fingers having coacting electrical contacts, the first finger of each pair when said edge is in effective relation thereto allowing said first finger to move and change the cooperative relation of said contacts and the second finger when said edge is in effective relation thereto allowing said second finger to move and reestablish the cooperative relative relation existing prior to the movement of said one finger, selectively actuated mechanism for controlling each of said valves and connected in series with the contacts of a corresponding pair of fingers such that movement of said one finger opens the corresponding valve and subsequent movement of the other finger closes said valve when circuits including said contacts and valve-actuating means are otherwise closed, and mechanisms for selectively otherwise closing said circuits to thereby select the valves to be controlled by said controlling member during a subsequent actuation.

8. In combination, a plurality of containers, a valve controlling discharge from each of said containers, a device for receiving the discharge from all of said valves, a valve-controlling member, means for moving said member in one direction to a predetermined limit and for then returning said member to starting position, said member having a controlling edge portion, a pair of fingers for each valve, operative connections from said fingers mounted to bear against said member when said member is moved in said direction, means for adjusting said connections independently in said direction to adjust the time when said edge portion is effective thereon during motion of said member, each pair of fingers having coacting electrical contacts, the first finger of each pair when said edge is in effective relation thereto allowing said first finger to move and change the cooperative relation of said contacts and the second finger when said edge is in effective relation thereto allowing said second finger to move and reestablish the cooperative relative relation existing prior to the movement of said one finger, selectively actuated mechanism for controlling each of said valves and connected in series with the contacts of a corresponding pair of fingers such that movement of said one finger opens the corresponding valve and subsequent movement of the other finger closes said valve when circuits including said contacts and valve-actuating means are otherwise closed, mechanisms for selectively otherwise closing said circuits to thereby select the valves to be controlled by said controlling member during a subsequent actuation, and means for automatically opening said selective closing mechanisms after each actuation of said control member.

9. In combination, a plurality of containers, a valve controlling discharge from each of said containers, a device for receiving the discharge from all of said valves, a valve-controlling member, means for moving said member in one direction to a predetermined limit and for then returning said member to starting position, said member having a controlling edge portion, a pair of fingers for each valve, operative connections from said fingers mounted to bear against said member when said member is moved in said direction, means for adjusting said connections independently in said direction to adjust the time when said edge portion is effective thereon during said motion of said member, each pair of fingers having coacting electrical contacts, the first finger of each pair when said edge is in effective relation thereto allowing said first finger to move and change the cooperative relation of said contacts and the second finger when said edge is in effective relation thereto allowing said second finger to move and reestablish the cooperative relative relation existing prior to the movement of said one finger, selectively actuated mechanism for controlling each of said valves and connected in series with the contacts of a corresponding pair of fingers such that movement of said one finger opens the corresponding valve and subsequent movement of the other finger closes said valve when circuits including said contacts and valve-actuating means are otherwise closed, mechanisms for selectively otherwise closing said circuits to thereby select the valves to be controlled by said controlling member during a subsequent actuation, means for automatically opening said selective closing mechanisms after each actuation of said control member, and means for interlocking said selecting mechanisms to prevent the actuation of more than one of said selective mechanisms for each actuation of said control member.

10. In combination, a plurality of containers, a valve controlling the discharge from each of said containers, a device for receiving the discharge from all of said valves, a valve controlling member, power means for moving said member first in one direction and then in the opposite direction, a pair of fingers for each valve mounted to bear against said member, means for adjusting said fingers independently of each other lengthwise of the direction of motion of said member, said member having a controlling edge for each of said fingers with respect to which said adjustment is effective, a spring normally pressing each of said fingers toward said member and effective to move its respective finger into controlling position when said edge is moved therepast, one of each pair of fingers when in controlling position being effective to open its respective valve and the other of the fingers of said pair when in controlling position being effective with said one finger to close said valve, mechanisms for selecting the pairs of the fingers to be operative during each motion of said member in one direction, and operator-controlled means for initiating the motion of said control member in controlling direction.

11. In combination, a plurality of containers, a valve controlling the discharge from each of said containers, a device for receiving the discharge from all of said valves, a valve controlling member, power means for moving said member first in one direction and then in the opposite direction, a pair of fingers for each valve mounted to bear against said member, means for adjusting said fingers independently of each other lengthwise of the direction of motion of said member, said member having a controlling edge for each of said fingers with respect to which said adjustment is effective, a spring normally pressing each of said fingers toward said member and effective to move its respective finger into controlling position when said edge is moved therepast, one of each pair of fingers when in controlling position being effective to open its respective valve and the other of the fingers of said pair when in controlling position being effective with said one finger to close said valve, mechanisms for selecting the pairs of the fingers to be operative during each motion of said member in one direction, operator-controlled means for initiating the motion of said control member in controlling direction, means for actuating said power means to return said member to starting position on completion of a predetermined extent of motion of said member in controlling direction at the end of which all of said valves are closed, and means for holding all of said fingers in inoperative position during such return motion of said member.

12. In combination, a plurality of containers, a valve controlling discharge from each of said containers, a device for receiving the discharge from all of said valves, a valve-controlling member, means for moving said member in one direction to a predetermined limit and for then returning said member to starting position, said member having a controlling edge portion, a pair of fingers for each valve mounted to bear against said member when said member is moved in said direction, means for adjusting said fingers independently in said direction to adjust the time when said edge portion is effective thereon during said motion of said member, each pair of fingers having coacting electrical contacts, the first finger of each pair when said edge is in effective relation thereto allowing said first finger to move and change the cooperative relation of said contacts and the second finger when said edge is in operative relation thereto allowing said second finger to move and reestablish the cooperative relative relation existing prior to the movement of said one finger, selectively actuated mechanism for controlling each of said valves and connected in series with the contacts of a corresponding pair of fingers such that movement of said one finger opens the corresponding valve and subsequent movement of the other finger closes said valve when circuits including said contacts and valve-actuating means are otherwise closed, and mechanisms for selectively otherwise closing said circuits to thereby select the valves to be controlled by said controlling member during a subsequent actuation.

13. In combination, a plurality of containers, a valve controlling discharge from each of said containers, a device for receiving the discharge from all of said valves, a valve-controlling member, means for moving said member in one direction to a predetermined limit and for then returning said member to starting position, said member having a controlling edge portion, a pair of fingers for each valve mounted to bear against said member when said member is moved in said direction, means for adjusting said fingers independently in said direction to adjust the time when said edge portion is effective thereon during said motion of said member, each pair of fingers having coacting electrical contacts, the first finger of each pair when said edge is in effective relation thereto allowing said first finger to move and change the cooperative relation of said contacts and the second finger when said edge is in operative relation thereto allowing second finger to move and reestablish the cooperative relative relation existing prior to the movement of said one finger, selectively actuated mechanism for controlling each of said valves and connected in series with the contacts of a corresponding pair of fingers such that movement of said one finger opens the corresponding valve and subsequent movement of the other finger closes said valve when circuits including said contacts and valve-actuating means are otherwise closed, mechanisms for selectively otherwise closing said circuits to thereby select the valves to be controlled by said controlling member during a subsequent actuation, and means for automatically opening said selective closing mechanisms after each actuation of said control member.

14. In combination, a plurality of containers, a valve controlling discharge from each of said containers, a device for receiving the discharge from all of said valves, a valve-controlling member, means for moving said member in one direction to a predetermined limit and for then returning said member to starting position, said member having a controlling edge portion, a pair of fingers for each valve mounted to bear against said member when said member is moved in said direction, means for adjusting said fingers independently in said direction to adjust the time when said edge portion is effective thereon during said motion of said member, each pair of fingers having coacting electrical contacts, the first finger of each pair when said edge is in effective relation thereto allowing said first finger to move and change the cooperative relation of said contacts and the second finger when said edge is in operative relation thereto allowing said second finger to move and reestablish the cooperative relative relation existing prior to the movement of said one finger, selectively actuated mechanism for controlling each of said valves and connected in series with the contacts of a corresponding pair of fingers such that movement of said one finger opens the corresponding valve and subsequent movement of the other finger closes said valve when circuits including said contacts and valve-actuating means are otherwise closed, mechanisms for selectively otherwise closing said circuits to thereby select the valves to be controlled by said controlling member during a subsequent actuation, means for automatically opening said selective closing mechanisms after each actuation of said control member, and means for interlocking said selecting mechanisms to prevent the actuation of more than one of said selective mechanisms for each actuation of said control member.

15. In combination, a plurality of containers, a valve for controlling the discharge from each of said containers, a valve controlling member, a reversible electric motor for moving said controlling member in controlling direction and by reverse operation to return said member to starting position, a controlling switch for each valve adjustable relative to said member to be opened and thereafter closed at predetermined times during the controlling motion of said member through operation of said switches, a plurality of selector switches in series with the corresponding valve switches, starting switch means actuable to condition and start said motor in valve-controlling direction to open and then close valves in accordance with the adjustment of said controlling switches relative to said member, means for automatically reversing the direction of rotation of said motor when said member reaches a predetermined limit of controlling motion, means for automatically stopping the motor when said member has been returned to starting position, and means actuated by said member on such return to return said selector switches to inoperative conditions.

GEORGE S. HARRIS, Jr.

References Cited in the file of this patent

UNITED STATES PATENTS

| Number | Name | Date |
|---|---|---|
| 563,464 | Fahrney | July 7, 1896 |
| 1,990,635 | Buttner | Feb. 12, 1935 |
| 2,023,373 | Notar et al. | Dec. 3, 1935 |
| 2,305,510 | Ayars | Dec. 15, 1942 |
| 2,346,290 | Carlson | Apr. 14, 1944 |
| 2,376,403 | Thompson et al. | May 22, 1945 |
| 2,461,772 | Ray | Feb. 12, 1948 |
| 2,462,019 | Bowman | Feb. 15, 1949 |